United States Patent [19]
Nakamura et al.

[11] 3,864,428
[45] Feb. 4, 1975

[54] POLYESTER/POLYCARBONATE/GRAFT COPOLYMER THERMOPLASTIC RESIN COMPOSITION

[75] Inventors: Yositugu Nakamura; Ryoichi Hasegawa; Hiroaki Kubota, all of Iwakuni, Japan

[73] Assignee: Teijin Limited, Osaka, Japan

[22] Filed: Aug. 27, 1973

[21] Appl. No.: 392,002

[30] Foreign Application Priority Data
Aug. 30, 1972 Japan.............................. 47-86283

[52] U.S. Cl............ 260/873, 260/18 R, 260/33.6 R, 260/37 PC
[51] Int. Cl............................................ C08g 39/10
[58] Field of Search ........... 260/873, 860, 876, 880, 260/47 XA

[56] References Cited
UNITED STATES PATENTS
3,130,177  4/1964  Grabowski.......................... 260/873
3,663,471  5/1972  Schirmer.......................... 260/873
3,758,640  9/1973  Thorpe .............................. 260/873

Primary Examiner—Melvin Goldstein
Assistant Examiner—T. Pertilla
Attorney, Agent, or Firm—Sherman & Shalloway

[57] ABSTRACT

A thermoplastic resin composition which comprises
  A. 25 to 85 percent by weight of an aromatic polyester,
  B. 10 to 75 percent by weight of an aromatic polycarbonate, and
  C. 2 to 35 percent by weight of a graft copolymer of a butadiene polymer-vinyl monomer, the proportion of the butadiene polymer component in the graft copolymer being 1 to 30 percent by weight based on the total weight of the components (A), (B) and (C).

8 Claims, No Drawings

POLYESTER/POLYCARBONATE/GRAFT COPOLYMER THERMOPLASTIC RESIN COMPOSITION

This invention relates to a synthetic thermoplastic resin composition which exhibits unexpected impact strength along with other desirable properties such as superior shapability, good resistance to thermal deformation, or good chemical resistance.

More specifically, this invention relates to a composition comprising

A. 25 to 85 percent by weight, preferably about 40 to about 80 percent by weight, of an aromatic polyester, B. 10 to 75 percent by weight, preferably about 20 to about 60 percent by weight of an aromatic polycarbonate, and C. 2 to 35 percent by weight, preferably about 3 to 25 percent by weight of a butadiene polymer/vinyl monomer graft copolymer, the amount of the butadiene polymer component in the graft copolymer being 1 to 30 percent by weight, based on the total amount of (A), (B) and (C).

A resin composition comprising a blend of an aromatic polycarbonate resin and a butadiene graft copolymer has previously been proposed in order to impart improved thermoplastic properties to an aromatic polycarbonate and improve the shapability of the resin. For example, U.S. Pat. No. 3,130,177 discloses a blended composition of a polycarbonate of a di-(mono-hydroxyphenyl)-substituted aliphatic hydrocarbon and a graft copolymer of polybutadiene and a mixture of an alkenyl cyanide and a vinyl aromatic hydrocarbon as a composition having excellent thermoplastic properties.

Furthermore, U.S. Pat. No. 3,162,695 discloses a blended composition of a polycarbonate of a di-(monohydroxy-phenyl)-substituted aliphatic hydrocarbon and a graft copolymer of a butadiene-vinyl aromatic hydrocarbon copolymer and a mixture of an alkyl acrylate and a vinyl aromatic hydrocarbon as a composition having excellent thermoplastic properties.

Furthermore, it is also known by Japanese Patent Publication No. 14035/1961 that when a polyethylene terephthalate resin is blended with an aromatic polycarbonate resin having poor shapability, its shapability is enhanced.

Expectedly, in the resin compositions proposed in the above two U.S. Patents, the impact strength of the aromatic polycarbonate resin is improved. On the other hand, in the resin composition proposed in the Japanese Patent Publication, the impact strength of the aromatic polycarbonate resin is reduced. However, unexpectedly, it was found that when a butadiene polymer/vinyl monomer graft copolymer is incorporated into blended resin composition of an aromatic polyester resin and on aromatic polycarbonate resin, preferably a composition wherein the aromatic polycarbonate resin is less than the aromatic polyester resin in 100 parts by weight of the two, in an amount such that the amount of the butadiene polymer component in the graft copolymer is 1 to 30 percent by weight of the total resin composition, the impact strength of the composition is very much improved, and the resulting composition is a thermoplastic resin composition having superior shapability, especially suited for injection molding, dimensional stability at the time of molding, resistance to thermal deformation, and chemical resistance.

It is not entirely clear why such unexpected results can be obtained. However, these surprising results can be readily understood from the experimental results shown in Tables A and B below. Table A shows the results with (A) polytetramethylene terephthalate (resin A), (B) a polycarbonate of 2,2-(4,4'-dihydroxydiphenyl)-propane (resin B), and (C) poly(butadiene-styrene)-methyl methacrylate and styrene graft copolymer (resin C: the ratio of butadiene/styrene in the trunk polymer being 70/30, the methyl methacrylate/styrene ratio in the graft comonomer is 60/40), and Table B shows the results with a resin composition comprising (A) polyhexamethylene-2,6-naphthalate (resin A'), (B) the resin B described above, and (C) the resin C mentioned above. The various properties of these compositions shown in Tables A and B are in accordance with the same measuring methods as shown in the Examples to be given later on.

Table A

| Resin composition | Runs Nos. | | | | | |
|---|---|---|---|---|---|---|
| | No. 1 | No. 2 | No. 3 | No. 4 | No. 5 | No. 6 |
| Resin A | 100 | 0 | 0 | 40 | 80 | 50 |
| Resin B | — | 100 | 40 | 40 | — | 50 |
| Resin C | — | — | 60 | 20 | 20 | — |
| Properties | | | | | | |
| Impact strength (Kg.cm/cm) | 5.1 | 15 | 36 | 62.5 | 21 | 9.8 |
| Melt viscosity at 260°C. (× 10³ poises) | 5.2 | 18.5 | 50 | 12.6 | 4.5 | 4.4 |
| Heat deformation temperature at 18.5 Kg/cm² (°C.) | 52 | 135 | 58 | 76 | 47 | 108 |
| Shrinkage at the time of molding (cm/cm) | 0.021 | 0.006 | 0.007 | 0.006 | 0.015 | 0.006 |
| Chemical resistance | 0 | Δ | X | O | O | O |

Except Run No. 4, all the other Runs shown in Table A are for comparative purposes. The composition of the present invention has a high impact strength of at least 15 Kg.cm/cm, preferably at least 20 Kg.cm/cm, a melt viscosity of 5 to 15 (× 10³) poises at 260°C., a heat deformation temperature at 18.5 Kg/cm² of at least 70°C., a shrinkage at the time of molding of not more than 0.01 cm/cm, and good chemical resistance. It is seen that the composition shown in Run No. 4 has these properties.

Resin B shown in Run No. 2 in Table A shows an impact strength of 15 Kg.cm/cm, and a composition consisting of a blend of 40 parts by weight of resin B with 60 parts by weight of high-impact resin C has an impact strength of 36 Kg.cm/cm. As is well known, resin C is rubbery, and the measurement of impact strength cannot be performed because of a measuring operation, but its impact strength will naturally exceed 100 Kg.cm/cm. When as shown in Run No. 4, the amount of the high-impact resin C is reduced to one-third in Run No. 3, and the reduced amount is made up for by the low-impact aromatic polyester resin A shown in Run No. 1, it is surprising to find that in spite of the fact that the amount of the high-impact resin C is reduced, and the low-impact resin A is added in an amount of 40 percent by weight based on the total weight of the composition, the impact strength increases to about two times that of the composition in Run No. 3, and in addition, the composition simultaneously has the above-described desirable properties. Run No. 5 demonstrates that when the high-impact resin C is used in the same amount as in Run No. 4, and the aromatic polycarbonate resin B is omitted and replaced by the aromatic polyester resin A, the unexpected results of Run No. 4 are lost. Furthermore, the dimensional stability at the time of molding is lost.

Furthermore, it is seen from Run No. 6 that a blend of the resin A and the resin B shows an impact strength which has reduced to an arithmetic mean of the impact strengths of these two resins, and does not show at all the synergistic effect exhibited by the blend in Run No. 4.

Table B

| Resin composition | Runs Nos. | | | | | |
|---|---|---|---|---|---|---|
| | No. 1 | No. 2 | No. 3 | No. 4 | No. 5 | No. 6 |
| Resin A | 100 | — | — | 40 | 80 | 50 |
| Resin B | — | 100 | 40 | 40 | — | 50 |
| Resin C | — | — | 60 | 20 | 20 | — |
| Properties | | | | | | |
| Impact strength (Kg.cm/cm) | 3.2 | 15 | 43 | 70 | 1.8 | 7.1 |
| Melt viscosity at 260°C. ($\times 10^3$ poises) | 18 | 18.5 | 48 | 8.6 | 2.8 | 12.0 |
| Heat deformation temperature at 18.5 Kg/cm$^2$ (°C.) | 60 | 135 | 61 | 91 | 55 | 59 |
| Shrinkage at the time of molding (cm/cm) | 0.019 | 0.006 | 0.007 | 0.006 | 0.015 | 0.007 |
| Chemical resistance | O | Δ | X | O | O | O |

It is also seen from Table B that as mentioned with reference to Table A, unexpected and unobvious results are likewise obtained even when a polyalkylene-2,6-naphthalate resin, for example, polyhexamethylene-2,6-naphthalate resin, is used instead of the poly(tetramethylene terephthalate) resin as the aromatic polyester.

Accordingly, it is an object of this invention to provide a synthetic thermoplastic resin composition exhibiting unexpected impact strength along with other desirable properties such as excellent shapability, good resistance to thermal deformation, and good chemical resistance.

Many other objects and advantages of the present invention will become more apparent from the following description.

The aromatic polyester used for the composition of this invention is a polyester having chain units containing an optionally substituted aromatic ring in the main chain of the polymer. Examples of the substituent for the aromatic ring are halogen atoms such as chlorine or bromine, $C_1 - C_4$ alkyl groups such as a methyl, ethyl or tert.-isobutyl group. These aromatic polyesters can be obtained by reacting aromatic dicarboxylic acids or ester-forming derivatives thereof with glycols by means known per se.

Such an acid component may be selected from the group consisting of naphthalene-2,6-dicarboxylic acid and terephthalic acid which may have a substituent such as mentioned above and ester-forming derivatives thereof, such as lower alkyl esters. The glycols may be polymethylene glycols having 2 to 6 carbons atoms, especially 1,4-butanediol and 1,6-heptanediol. A part (preferably about not more than 30 mol percent) of the acid component and/or glycol component may be replaced by other acids or ester-forming derivatives thereof. Examples of the other acid component are isophthalic acid, p-hydroxybenzoic acid, adipic acid, sebacic acid, naphthalene dicarboxylic acids other than the naphthalene-2,6-dicarboxylic acid, and ester-forming derivatives thereof. Examples of the other glycol component are 1,4-cyclohexanediol, bisphenol A and ester-forming derivatives thereof.

Examples of the preferred aromatic polyester (A) are polyethylene terephthalate, polytetramethylene terephthalate, polyhexamethylene terephthalate, polyethylene-2,6-naphthalate, polytetramethylene-2,6-naphthalate, and polyhexamethylene-2,6-naphthalate. These polymers can be used either alone or in combination.

The aromatic polycarbonate used for the composition of this invention is preferably a polycarbonate of a di(monohydroxyphenyl)-substituted aliphatic hydrocarbon, for example, it is possible to utilize an aromatic polycarbonate derived by the ester-exchange process or phosgene process from 2,2-(4,4'-dihydroxydiphenyl)-propane (to be referred to simply as bisphenol A). Furthermore, it is possible to replace a part or whole of the bisphenol A by a 4,4'-dihydroxydiphenylalkane, 4,4'-dihydroxydiphenylsulfone, or 4,4'-dihydroxydiphenyl ether. Or two or more of such aromatic polycarbonates may be used in admixture.

The preferred butadiene polymer/vinyl monomer graft copolymer used in the present invention is a graft copolymer formed between a butadiene polymer whose butadiene units account for at least 50 mol percent and a vinyl monomer. Examples of such a vinyl monomer are methacrylic esters, aromatic monovinyl compounds, vinyl cyanide compounds, and mixtures thereof. Specific examples include $C_1 - C_4$ alkyl esters of methacrylic acid, preferably methyl methacrylate; aromatic monovinyl compounds such as styrene, vinyl toluene, α-methylstyrene, nuclearly halogenated styrene or vinyl naphthalene, the styrene being especially preferred; and vinyl cyanaide compounds such as acrylonitrile, methacrylonitrile, α-halogenated acrylonitriles, the acrylonitrile being especially preferred. They can be used either alone or in admixture.

The graft copolymer is preferably one having a grafting ratio of about 15 to 200 percent, especially 30 to 120 percent. If the grafting ratio is lower than the above-specified range, the degree of the improvement of the impact strength and the outer appearance of the molded product tend to become unsatisfactory. If it is too high, the improvement of the impact strength tends to become unsatisfactory.

In the present invention, the grafting ratio (percent) is a value calculated in accordance with the following equation.

Grafting ratio (%) = [(Weight of the acetone-insoluble portion/Weight of the butadiene polymer in the graft copolymer (c)) − 1] ×100

The use of at least two of the monomers selected from methyl methacrylate, styrene and acrylontrile is especially preferred for use as the vinyl monomer in the graft copolymer (C) in the present invention. For example, we can mention a combination of methyl methacrylate and styrene, and a combinatnion of styrene and acrylonitrile. In the former combination, the preferred proportion of styrene is 10 to 60 mol percent especially 20 to 40 mol percent, as against 90 to 40 mol percent, especially 80 to 60 mol percent, of methyl methacrylate. Furthermore, in the latter combination, the preferred proportion of acrylonitrile is 20 to 40 mol percent, especially 30 ± 5 mol%, as against 80 to 60 mol percent, especially 70 ± 5 mol percent The graft copolymer (C) used in the present invention can be produced by any known means such as a bulk polymerization, suspension polymerization, bulk-suspension polymerization, solution polymerization or emulsion polymerization. when it is desired to produce graft copolymer (C) having a major proportion of the butadiene polymer, the use of the emulsion polymerization technique is recommended. In the production of graft polymer (C), a homo- or co-polymer of the vinyl monomer may be formed in the reaction product. But the reaction product as such may be used as the graft co-polymer (C).

When the graft copolymer (C) is used as a mixture containing the above-mentioned vinyl homopolymer or copolymer the proportion of the vinyl homopolymer or copolymer is desirably not more than 50 percent by weight based on the mixture. Furthermore, with a view to improving the compatibility between the polycarbonate (B) and the graft copolymer (C), a vinyl copolymer, especially an acrylonitrile/styrene copolymer, may be added in a proportion of not more than 35 percent by weight.

The preferred aromatic polyester (A) has a reducing specific viscosity, as measured at 35°C. using a solution of 1.2 g of polymer in 100 ml. of ortho-chlorophenol, of about 0.3 to about 2.5. The aromatic polycarbonate (B) has a molecular weight of 15,000 to 50,000, preferably 20,000 to 35,000. The preferred graft copolymer (C) contains a trunk polymer portion in an amount of 20 to 80 percent by weight, preferably 40 to 60 percent by weight, of the graft copolymer (C).

The composition of the present invention comprises 25 to 85 percent by weight, preferably about 40 to about 80 percent by weight, of aromatic polyester (A), 10 to 75 percent by weight, preferably about 20 to about 60 percent by weight, of the aromatic polycarbonate (B), and 2 to 35 percent, by weight, preferably about 3 to about 25 percent by weight of the graft copolymer (C). Furthermore, it is necessary that the proportion of the butadiene polymer component in the graft polymer (C) is 1 to 30 percent by weight based on the sum total of the amounts of the resins (A), (B) and (C).

In the above proportion, it is preferred that the aromatic polyester (A) is in a larger proportion than the aromatic polycarbonate (B). For example, a combination of 50 to 80 percent by weight of the aromatic polyester (A) and 50 to 20 percent by weight of the aromatic polycarbonate (B) can be preferably utilized.

If the proportions are outside the above-specified range, it is difficult to achieve the improvement of unexpected impact strength properties along with other desirable properties such as superior shapability, good resistance to thermal deformation and good chemical resistance.

The thermoplastic resin composition of this invention can be prepared by uniformly mixing the above resin components (A), (B) and (C) using any desired mixing means, for example, using a Bumbury's mixer, a hot roll or a uniaxial or multiaxial extruder. The method of blending the three components in order to obtain the thermoplastic resin composition is not particularly limited. Generally, it is preferred that the components (A), (B) and (C) are blended simultaneously, and the mixture is granulated through an extruder.

The composition of this invention may be in various forms such as powder, granule, flake, pellet or other forms of molding material, or various forms of melt-shaped articles such as extrusion molded articles or injection molded articles. The composition gives especially good results in the production of injection-molded articles. Needless to say, the composition may further contain various additives such as a stabilizer, coloring agent, fire retardant, fluorescent bleaching agent, mold releasing agent, nucleating agent, lubricant, filler, or blowing agent.

The stabilizer may, for example, be an oxidation stabilizer, light stabilizer, or heat stabilizer. Specific examples of the light stabilizer are benzotriazole compounds such as 2-hydroxy-5-methylbenzotriazole or 2-hydroxy-3-chloro-5-t-butylbenzotriazole, benzophenone compounds such as 2,4-dihydroxybenzophenone, and phenyl salicylate-type compounds such as phenyl salicylate. Examples of the oxidation stabilizer include hindered phenol compounds such as stearyl 3,5-di-t.-butyl-4-hydroxyphenyl propionate, and amine compounds such as N,N'-di-β-naphthyl-para-phenylene diamine. Examples of the heat stabilizer include sulfur compounds such as dilauryl thiopolypionate, and phosphorus compounds such as phosphoric acid, phosphorus acid, phosphinic acid, phosphonic acid, or esters thereof.

The coloring agent may be any desired dye or pigment.

Examples of the fire retarding agent are halogen-containing aromatic compounds such as hexabromobenzene, an oligomeric polycarbonate of tetrabromobisphenol a, decarbromobiphenyl, decarbromobiphenyl ether, or tetrabromophthalic anhydride, and phosphorus compounds such as tris(2,3-dibromo-propyl phosphate) or polyaryl phosphonates, the retarding agent being usable conjointly with an assistant such as antimony trioxide.

Examples of the mold releasing agent include silicone.

Examples of the lubricant are barium stearate, calcium stearate, or fluid paraffin.

The nucleating agent may, for example, be an inorganic nucleating agent such as talc, an organic nucleating agent such as benzophenone, or a salt such as sodium terephthalate.

The filler includes, for example, glass fibers, carbon fibers, asbestos, or rock wool. The incorporation of these fillers is preferred because they give rise to more improvement in the mechanical characteristics, resistance to thermal deformation and fire retardance of the composition of this invention.

Preferably, the amounts of these additives are as follows based on the total weight of the resin components (A), (B) and (C): not more than 5 percent by weight of the stabilizer; not more than 30 percent by weight of the fire retardant (as a total amount, when an assistant is used); 0.05 to 5 percent by weight of the mold releasing agent; 0.01 to 5 percent by weight of the nucleating agent; 0.01 to 5 percent by weight of the nucleating agent; 0.01 to 5 percent by weight of lubricant; 1 to 5 percent by weight of the filler. The amount of the coloring agent is usually 0.01 to 5 percent by weight based on the total weight of the resins (A), (B) and (C).

The following Examples illustrate the present invention in greater detail. All parts and percentages in the Examples are on a weight basis.

The various properties of the compositions obtained were measured in accordance with the following methods.

IMPACT STRENGTH

ASTM D-256

HEAT DISTORTION TEMPERATURE

ASTM D-648

MOLDING SHRINKAGE

ASTM D-955

MELT VISCOSITY

"Koka"—type flow tester was used under a load of 100 Kg/cm$^2$ with a nozzle having a diameter of 1.0 mm and a length of 10 mm.

CHEMICAL RESISTANCE

ASTM D 543-56T (The results are indicated on a scale of which shows that the sample exhibited resistance to more than 60 percent of the standard reagents specified therein Δ which shows that the sample exhibited resistance to 40 to 60 percent thereof, and X which shows that the sample exhibited resistance to less than 40 percent thereof.

REDUCING SPECIFIC VISCOSITY

Measured at 35°C. on a solution of 1.2 g polymer in 100 ml. ortho-chlorophenol.

In the Examples, the following abbreviations will be used.

| Abbreviations | Standing for |
|---|---|
| PETP | Polyethylene terephthalate |
| PTMTP | Polytetramethylene terephthalate |
| PHMTP | Polyhexamethylene terephthalate |
| PEN | Polyethylene-2,6-naphthalate |
| PTMN | Polytetramethylene-2,6-naphthalate |
| PHMN | Polyhexamethylene-2,6-naphthalate |
| Bu | Butadiene |
| St | Styrene |
| AN | Acrylonitrile |
| MMA | Methyl methacrylate |
| PC(L) | Polycarbonate "PANLITE L-1250" (tradename for the product of Teijin Chemical Co. Ltd., molecular weight 25,000) |
| PC(H) | Polycarbonate "PANLITE H-1310" (tradename of the product of Teijin Chemical Co. Ltd., molecular weight 30,000) |

EXAMPLES 1 TO 17 AND COMPARATIVE EXAMPLES 1 TO 20

The aromatic polyesters, aromatic polycarbonates and graft copolymers indicated in Tables 1 to 3 below were mixed in the proportions shown in these Tables and melt extruded by an extruder to form molding pellets. Test pieces were prepared by injection molding the resulting pellets, and the various properties of the molded articles were measured. The results obtained are shown in Tables 1 to 3.

Tables 1 to 3 further show the results of comparisons in which the compositions lack one or more requirements of the composition of the present invention. In the Tables, the numerical figures in the parentheses in the column dealing with the graft copolymer show the amounts in parts by weight. For example, the indication poly [Bu(a)—St(b)] (c)—MNA (d)_St(e) means that this is a graft copolymer obtained by graft copolymerizing (d) parts by weight of methyl methacrylate and (e) parts by weight of styrene with (c) parts of a polymer of (a) parts by weight of butadiene and (b) parts by weight of styrene. The percentages at the end show the grafting ratio.

Table 1

| No. | Type | Reducing specific viscosity | Amount (wt.%) | Aromatic Polyester (A) Aromatic Polycarbonate (B) Type | Amount (wt.%) | Graft Copolymer (C) Type | Amount (wt.%) |
|---|---|---|---|---|---|---|---|
| Comp. Ex. 1 | PTMN | 1.18 | 100 | — | — | — | — |
| Comp. Ex. 2 | — | — | — | PC(L) | 100 | — | — |
| Ex. 1 | PTMN | 1.18 | 47.5 | do. | 47.5 | Poly[Bu(70)-St(30)]60-MMA(24)-St(16):57.3% | 5 |
| Ex. 2 | do. | do. | 45 | do. | 45 | do. | 10 |
| Ex. 3 | do. | do. | 40 | do. | 40 | do. | 20 |
| Comp. Ex. 3 | — | — | — | do. | 50 | do. | 50 |
| Comp. Ex. 4 | PTMN | 1.18 | 20 | do. | 40 | do. | 40 |
| Comp. Ex. 5 | do. | do. | 50 | do. | 50 | — | — |
| Comp. Ex. 6 | do. | do. | 49 | do. | 50 | do. | 1 |
| Comp. Ex. 7 | PETP | 0.68 | 100 | — | — | — | — |
| Ex. 4* | do. | do. | 55 | do. | 35 | Poly.Bu(60))-MMA(24)-St(16):43.1% | 10 |

Table 1 – Continued

| No. | Aromatic Polyester (A) Type | Reducing specific viscosity | Amount (wt.%) | Aromatic Polycarbonate (B) Type | Amount (wt.%) | Graft Copolymer (C) Type | Amount (wt.%) |
|---|---|---|---|---|---|---|---|
| Ex. 5* | do. | do. | 45 | do. | 45 | do. | 10 |
| Comp. Ex. 8 | do. | do. | 90 | do. | 30 | — | — |

Properties

| No. | Impact strength (kg.cm/cm) | Melt viscosity at 260°C (×10³ poise) | Heat distortion temperature at 18.5 kg/cm² (°C.) | Shrinkage at time of molding (cm/cm) | Chemical resistance |
|---|---|---|---|---|---|
| Comp. Ex. 1 | 4.1 | 6.5 | 82 | 0.020 | 0 |
| Comp. Ex. 2 | 15 | 18.5 | 135 | 0.006 | Δ |
| Ex. 1 | 13 | 12.7 | 113 | 0.006 | 0 |
| Ex. 2 | 21 | 12.6 | 106 | 0.005 | 0 |
| Ex. 3 | 54 | 14.8 | 93 | 0.006 | 0 |
| Comp. Ex. 3 | 43 | 42.5 | 80 | 0.006 | X |
| Comp. Ex. 4 | 47 | 28.2 | 72 | 0.007 | Δ |
| Comp. Ex. 5 | 5.3 | 10.9 | 119 | 0.007 | 0 |
| Comp. Ex. 6 | 6.4 | 11.2 | 118 | 0.007 | 0 |
| Comp. Ex. 7 | 3.2 | 12.0 | 68 | 0.019 | 0 |
| Ex. 4 * | 15 | 13.5 | 84 | 0.008 | 0 |
| Ex. 5 * | 17 | 5.1 | 86 | 0.008 | 0 |
| Comp. Ex. 8 | 3.5 | 16.0 | 86 | 0.009 | 0 |

*The graft copolymers (c) in Examples 4 and 5 are mixtures which contain about 40% by weight of a copolymer of vinyl monomers used in graft polymerization (MMA-St copolymer)

Table 2

| No. | Aromatic Polyester (A) Type | Reducing specific viscosity | Amount (wt.%) | Aromatic Polycarbonate (B) Type | Amount (wt.%) | Graft Copolymer (C) Type | Amount (wt.%) |
|---|---|---|---|---|---|---|---|
| Comp. Ex. 9 | PETP | 0.68 | 50 | PC(L) | 50 | — | — |
| Comp. Ex. 10 | do. | do. | 22 | do. | 77 | Poly Bu(60)-MMA(24)-St(16):43.1% | 1 |
| Comp. Ex. 11 | PTMTP | 1.64 | 100 | — | — | — | — |
| Ex. 6 | do. | do. | 63 | PC(L) | 27 | Poly[Bu(70)-St(30)]60-MMA(24)-St(16)]57.3% | 10 |
| Ex. 7 | do. | do. | 60 | do. | 25 | do. | 15 |
| Ex. 8 | do. | do. | 45 | do. | 45 | do. | 10 |
| Ex. 9 | do. | do. | 40 | do. | 40 | do. | 20 |
| Comp. Ex. 12 | — | — | — | do. | 40 | do. | 60 |
| Comp. Ex. 13 | PTMTP | 1.64 | 80 | — | — | do. | 20 |
| Comp. Ex. 14 | do. | do. | 50 | PC(L) | 50 | — | — |
| Ex. 10 | do. | 1.42 | 63 | PC(H) | 27 | Poly Bu(60)-MMA(24)-St(16):43.5% | 10 |
| Ex. 11 | do. | do. | 45 | do. | 45 | do. | 10 |
| Ex. 12 | do. | do. | 45 | do. | 45 | Poly Bu(60)-MMA(32)-St(8):40.9% | 10 |

Properties

| No. | Impact strength (Kg.cm/cm) | Melt viscosity at 260°C (×10³ poise) | Heat distortion temperature at 18.5 kg/cm² (°C.) | Shrinkage at time of molding (cm/cm) | Chemical resistance |
|---|---|---|---|---|---|
| Comp. Ex. 9 | 4.4 | 3.9 | 89 | 0.007 | 0 |
| Comp. Ex. 10 | 6.1 | 6.5 | 121 | 0.006 | Δ |
| Comp. Ex. 11 | 5.1 | 5.2 | 52 | 0.021 | 0 |
| Ex. 6 | 21 | 7.8 | 72 | 0.007 | 0 |
| Ex. 7 | 42 | 10.5 | 70 | 0.006 | 0 |
| Ex. 8 | 27 | 7.4 | 96 | 0.006 | 0 |
| Ex. 9 | 62 | 12.6 | 76 | 0.006 | 0 |
| Comp. Ex. 12 | 36 | 50.0 | 58 | 0.007 | X |
| Comp. Ex. 13 | 21 | 4.5 | 47 | 0.015 | 0 |
| Comp. Ex. 14 | 9.8 | 4.4 | 108 | 0.006 | 0 |
| Ex. 10 | 25 | 7.9 | 72 | 0.006 | 0 |
| Ex. 11 | 56 | 8.5 | 106 | 0.006 | 0 |
| Ex. 12 | 60 | 9.6 | 107 | 0.006 | 0 |

Table 3

| No. | Aromatic Polyester (A) Type | Reducing specific viscosity | Amount (wt.%) | Aromatic Polycarbonate (B) Type | Amount (wt.%) | Graft Copolymer (C) Type | Amount (wt.%) |
|---|---|---|---|---|---|---|---|
| Comp. Ex. 15 | PEN | 0.81 | 100 | — | — | — | — |
| Comp. Ex. 16 | do. | do. | 50 | PC(L) | 50 | — | — |
| Ex. 13 | do. | do. | 40 | do. | 40 | Poly Bu(45)-MMA(22)-St(28)-AN(5) 93.7% | 20 |
| Ex. 14 | do. | do. | 48 | do. | 32 | do. | 20 |

Table 3 — Continued

| No. | Aromatic Polyester (A) Type | Reducing specific viscosity | Amount (wt.%) | Aromatic Polycarbonate (B) Type | Amount (wt.%) | Graft Copolymer (C) Type | Amount (wt.%) |
|---|---|---|---|---|---|---|---|
| Comp. Ex. 17 | PHMN | 1.26 | 100 | — | — | — | — |
| Ex. 15 | do. | do. | 60 | PC(L) | 30 | Poly Bu(60)-MMA(24)-St(16):43.1% | 10 |
| Ex. 16 | do. | do. | 45 | do. | 45 | do. | 10 |
| Ex. 17 | do. | do. | 40 | do. | 40 | do. | 20 |
| Comp. Ex. 18 | — | — | — | do. | 40 | do. | 60 |
| Comp. Ex. 19 | PHMN | 1.26 | 80 | — | — | do. | 20 |
| Comp. Ex. 20 | do. | do. | 50 | PC(L) | 50 | — | — |

Properties

| No. | Impact strength (Kg.cm/cm) | Melt viscosity at 250°C ($\times 10^3$ poise) | Heat distortion temperature at 18.5 kg/cm² (°C) | Shrinkage at time of molding (cm/cm) | Chemical resistance |
|---|---|---|---|---|---|
| Comp. Ex. 15 | 2.5 | (at 275°C) 8.9 | 98 | 0.010 | 0 |
| Comp. Ex. 16 | 3.9 | (at 270°C) 3.8 | 119 | 0.007 | 0 |
| Ex. 13 | 18 | (do.) 8.2 | 101 | 0.007 | 0 |
| Ex. 14 | 15 | (do.) 9.8 | 93 | 0.006 | 0 |
| Comp. Ex. 17 | 3.2 | 1.8 | 60 | 0.019 | 0 |
| Ex. 15 | 16 | 5.5 | 71 | 0.007 | 0 |
| Ex. 16 | 27 | 6.7 | 111 | 0.006 | 0 |
| Ex. 17 | 70 | 8.6 | 91 | 0.006 | 0 |
| Comp. Ex. 18 | 43 | 48.0 | 61 | 0.007 | X |
| Comp. Ex. 19 | 18 | 2.8 | 55 | 0.015 | 0 |
| Comp. Ex. 20 | 7.1 | 12.0 | 59 | 0.007 | 0 |

What we claim is:

1. A thermoplastic resin composition consisting essentially of
   A. 25 to 85 percent by weight of an aromatic polyester,
   B. 10 to 75 percent by weight of an aromatic polycarbonate, and
   C. 2 to 35 percent by weight of a graft copolymer of a butadiene polymer-vinyl monomer which is selected from the group consisting of methacrylic esters, aromatic monovinyl compounds, vinyl cyanide compounds, and mixtures thereof, the proportion of the butadiene polymer component in the graft copolymer being 1 to 30 percent by weight based on the total weight of the components (A), (B) and (C).

2. The composition of claim 1 wherein said aromatic polyester (A) is selected from the group consisting of polyethylene terephthalate, polytetramethylene terephthalate, polyhexamethylene terephthalate, polyethylene-2,6-naphthalate, polytetramethylene-2,6-naphthalate, polyhexamethylene-2,6-naphthalate, and mixture thereof.

3. The composition of claim 1 wherein said graft copolymer (C) is one prepared from a butadiene polymer having at least 50 mol percent of butadiene units.

4. The composition of claim 1 wherein the aromatic polycarbonate (B) is a polycarbonate of a di(monohydroxyphenyl)-substituted aliphatic hydrocarbon.

5. The composition of claim 1 consisting essentially of (A) 40 to 80 percent by weight of the aromatic polyester, (B) 20 to 60 percent by weight on the aromatic polycarbonate, and (C) 3 to 25 percent by weight of the graft copolymer.

6. The composition of claim 1 which is in the form of injection molded article.

7. The composition of claim 1 having an impact strength of at least 15 Kg cm/cm, a melt viscosity of 5 to 15 ($\times 10^3$) poises at 260°C., a heat deformation temperature at 18.5 Kg/cm² of at least 70°C., a shrinkage at the time of molding of not more than 0.01 cm/cm, and good chemical resistance.

8. The composition of claim 7 wherein said composition has an impact strength of at least 20 Kg cm/cm.

* * * * *